(12) United States Patent
Jackson

(10) Patent No.: US 6,811,345 B2
(45) Date of Patent: Nov. 2, 2004

(54) FASTENER ASSEMBLY WITH SELF CENTERING ANTIROTATION ELEMENTS

(75) Inventor: Theodore J. Jackson, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 55 days.

(21) Appl. No.: 10/391,874

(22) Filed: Mar. 18, 2003

(65) Prior Publication Data
US 2004/0184868 A1 Sep. 23, 2004

(51) Int. Cl.[7] .............................. B25G 3/00; F16B 9/00; F16L 41/00; F16C 11/00; F16D 1/12
(52) U.S. Cl. ...................... 403/122; 403/259; 403/260; 403/348; 403/360; 403/375; 403/384
(58) Field of Search ................................ 403/127, 259, 403/260, 348, 360, 361, 375, 384; 411/399

(56) References Cited

U.S. PATENT DOCUMENTS 5,673,877 A * 10/1997 Karner et al. ................. 248/58

* cited by examiner

Primary Examiner—Christopher J. Novosad
(74) Attorney, Agent, or Firm—Laura C. Hargitt

(57) ABSTRACT

An interlocking fastener assembly has an insertion member, a receiving member, and a fastener. The receiving member has a guide opening with pockets which receive a polygonal locking portion of the insertion member during assembly. The locking portion has tapered sides and apexes to self center the insertion member. The guide opening pockets and sides allow limited rotation of the insertion member in the receiving member until a mechanical lock is created preventing further rotation of the insertion member. The mechanical lock allows a fastener to be threaded onto the insertion member without the use of a backup tool.

9 Claims, 4 Drawing Sheets

FASTENER ASSEMBLY WITH SELF CENTERING ANTIROTATION ELEMENTS

TECHNICAL FIELD

This invention relates to self-locking fastener assemblies and, more particularly, to an assembly having a self centering antirotation element that allows a fastener to be threaded onto an insertion member without the use of a backup tool.

BACKGROUND OF THE INVENTION

A variety of self-locking fasteners or fastening assemblies are known in the art. Typical self-locking assemblies provide a mechanical interlock between an insertion member, such as a bolt, and a receiving member having a locking opening to allow a fastener, such as a nut, to be threaded onto the insertion member without the use of a backup tool. However, current self-locking assemblies require proper alignment of the insertion member to create a mechanical interlock between the components. A slight misalignment during insertion can interfere with the mechanical interlock, causing the insertion member to rotate when a fastener is threaded onto the insertion member.

SUMMARY OF THE INVENTION

The present invention provides an interlocking fastener assembly including an insertion member, a receiving member, and a fastener. The receiving member is capable of guiding a misaligned insertion member into an interlocking position so that a fastener can be rotatably applied to the insertion member without the use of a backup tool.

In an exemplary embodiment, the insertion member is generally cylindrical and includes a connecting portion, an abutment, and a locking portion between the abutment and the connecting portion. The locking portion is typically square and tapered inward toward the connecting portion of the insertion member. The square locking portion has apexes and sides extending between the apexes. The connecting portion is typically threaded and the fastener may be a nut.

The receiving member has opposite sides defining a mounting surface, a fastening surface, and a guide opening extending between the surfaces. The opening resembles a truncated star having multiple pockets with sides angled inward and joined by inward projections between the pockets. The opening has a number of pockets equal to the number of apexes on the locking portion.

The inward taper of the locking portion provides an entry portion with smaller cross dimensions than the guide opening to provide additional room for insertion. As the insertion member is further inserted the tapered sides of the locking portion engage the sides of the receiving member to center the insertion member. During the insertion process, the pockets of the receiving member receive the apexes of the locking portion. Finally, the abutment of the insertion member engages the mounting surface and the connecting portion of the insertion member extends beyond the fastening surface of the receiving member.

Angular clearance between the sides of the locking portion and the sides of the pockets allows the insertion member to rotate within the opening for a predetermine angle. A mechanical lock is formed when the sides of the locking portion engage the inner sides of the pockets. The mechanical lock prevents rotation of the insertion member, which allows a fastener to be threaded, or otherwise rotatably applied, onto the insertion member without the need for a backup tool.

These and other features and advantages of the invention will be more fully understood from the following description of certain specific embodiments of the invention taken together with the accompanying drawings.

DESCRIPTION OF THE PREFERRED EMBODIMENT

Figure 1:
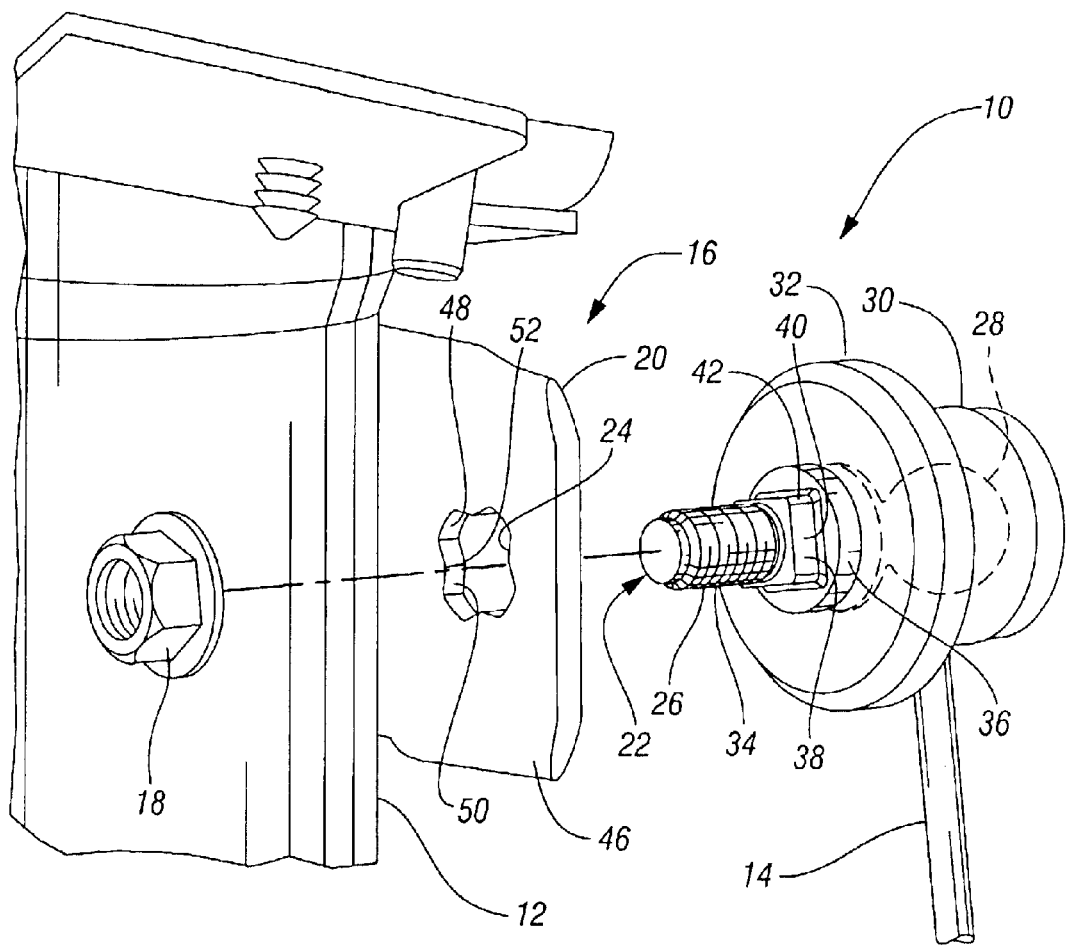
FIG. 1 is an exploded pictorial view of an exemplary interlocking fastener assembly according to the present invention as applied in a portion of an automotive suspension.
Figure 2:
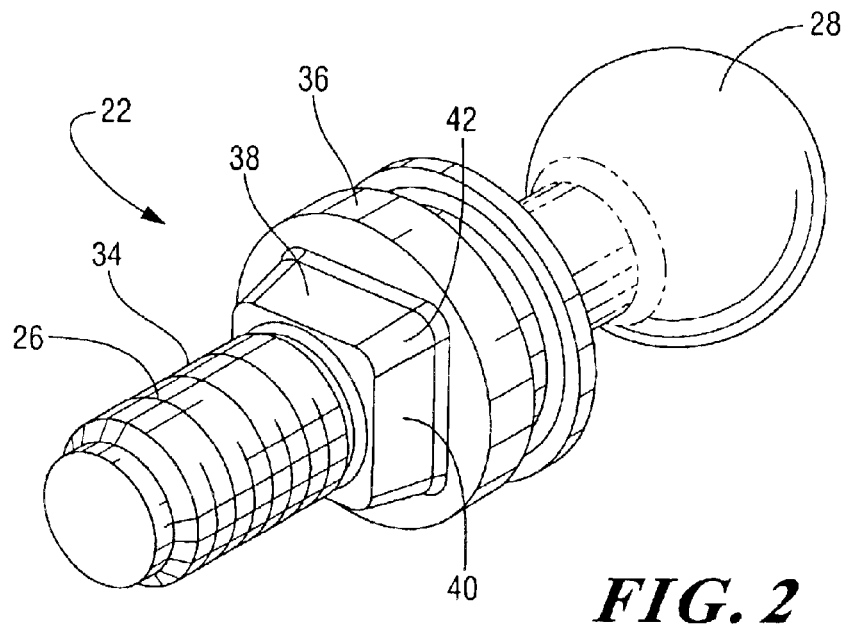
FIG. 2 is a pictorial view of an insertion member according to the present invention.
Figure 3:
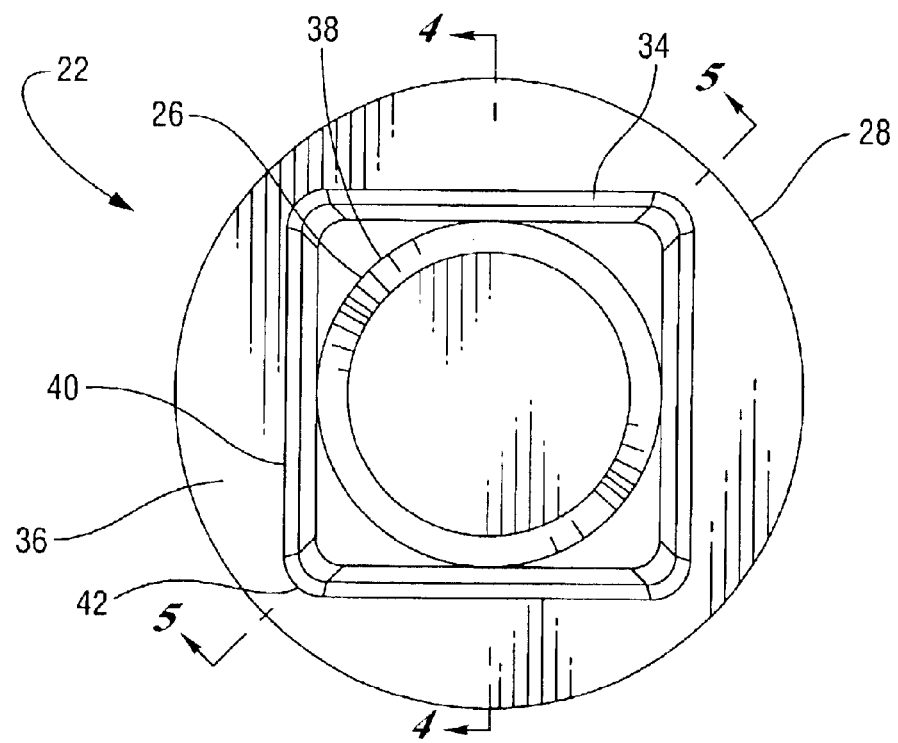
FIG. 3 is a connecting end view of the insertion member of FIG. 1.

Referring first to FIG. 1 of the drawings in detail, numeral 10 generally indicates a suspension assembly including a MacPherson strut 12 and a stabilizer link 14 attached to the strut 12 by an interlocking fastener assembly 16 according to the present invention. The fastener assembly 16 includes a nut 18, a flange 20, and a ball stud 22. The flange 20 extends from the strut 12 and has an opening 24 for receiving a threaded end portion 26 of the ball stud 22. The threaded portion 26 extends through the flange 20 and is secured by the nut 18. A ball end 28 on the ball stud 22 pivotally connects to a socket 30 at the end of the stabilizer link 14. A boot 32 is provided on the ball stud 22 to protect the pivotal connection.

FIG. 1 illustrates a particular embodiment of fastener assembly 16 according to the invention. However, a fastener assembly may assume many other forms within the scope of the invention. Thus, it is appropriate to use generic terms for the components wherein the ball stud 22 may be called an insertion member 22, the flange 20 may be a receiving member 20, and the nut 18 becomes a fastener 18.

Referring now to FIGS. 2–5, the ball stud or insertion member 22 is generally cylindrical and includes a threaded connecting portion 34, an abutment 36, and a locking portion 38 between the abutment 36 and the connecting portion 34. A ball 28 extends from the abutment 36 of the insertion member 22. Connecting portion 34 is threaded to receive a fastener 18, such as a nut. The locking portion 38 is typically square and tapered inward toward the connecting portion 34 of the insertion member 22. However, the shape of the locking portion 38 may vary to include any tapered polygonal shape.

Figure 4:
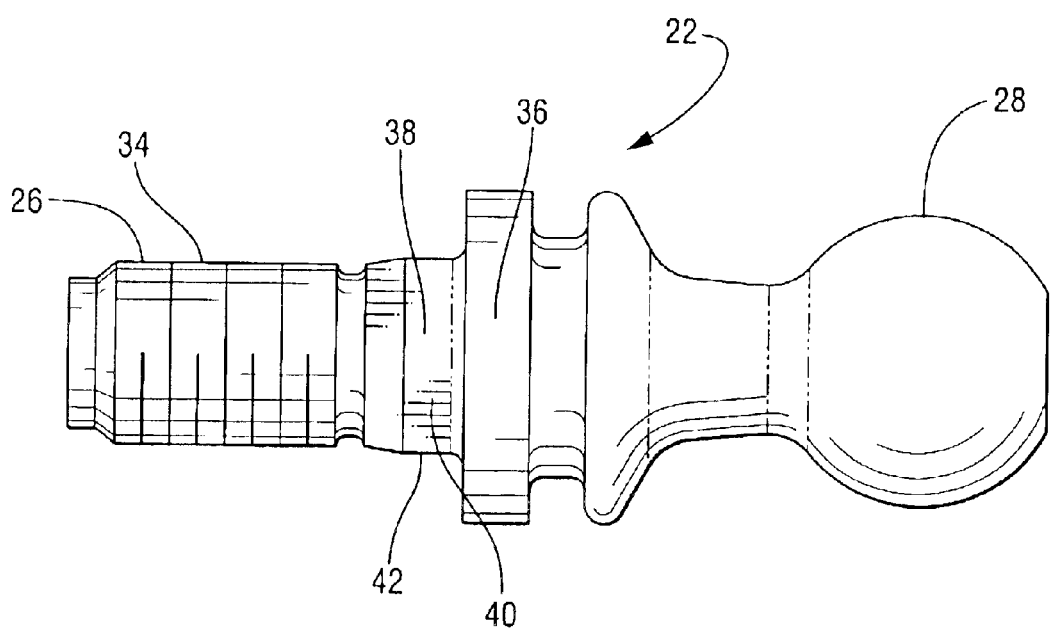
FIG. 4 is a side view in the direction of arrow 4 of FIG. 3.
Figure 5:
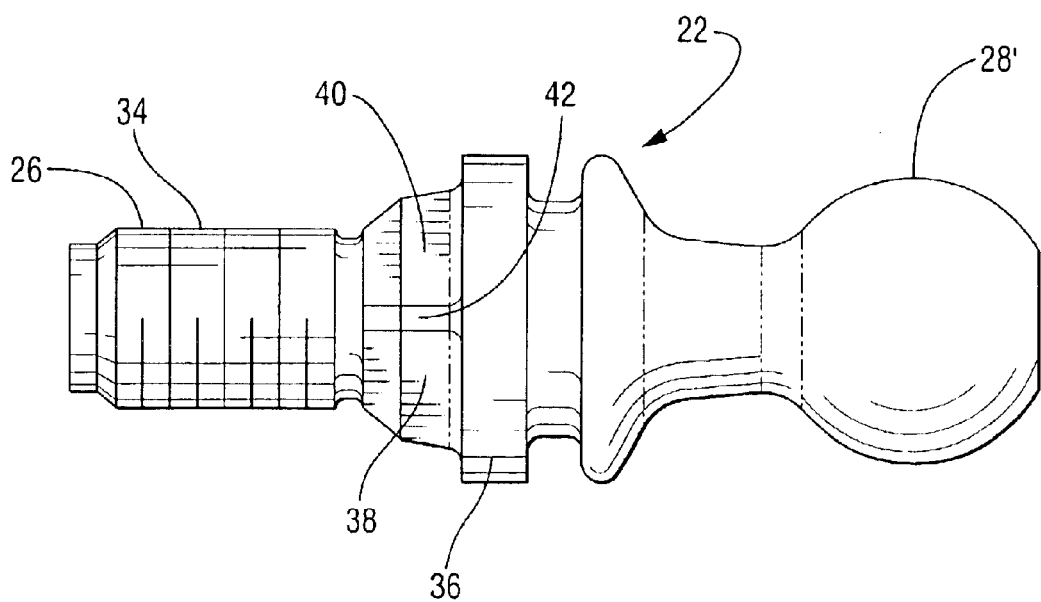
FIG. 5 is a side view in the direction of arrow 5 of FIG. 3.

The degree of taper on the locking portion 38 is best shown in FIGS. 4 and 5. Locking portion 38 has sides 40 and apexes 42. Generally, the apexes 42 have a greater taper angle than the sides 40. FIG. 4 shows side 40 of the locking portion 38 having a 4° taper angle toward the connecting portion 34 of the insertion member 22. FIG. 5 shows the tapered apex 42 having a taper angle between 12° and 36° extending from the abutment 36 toward the connecting portion 34. These angles may be varied as desired to suit the particular embodiment of the invention.

Figure 6:
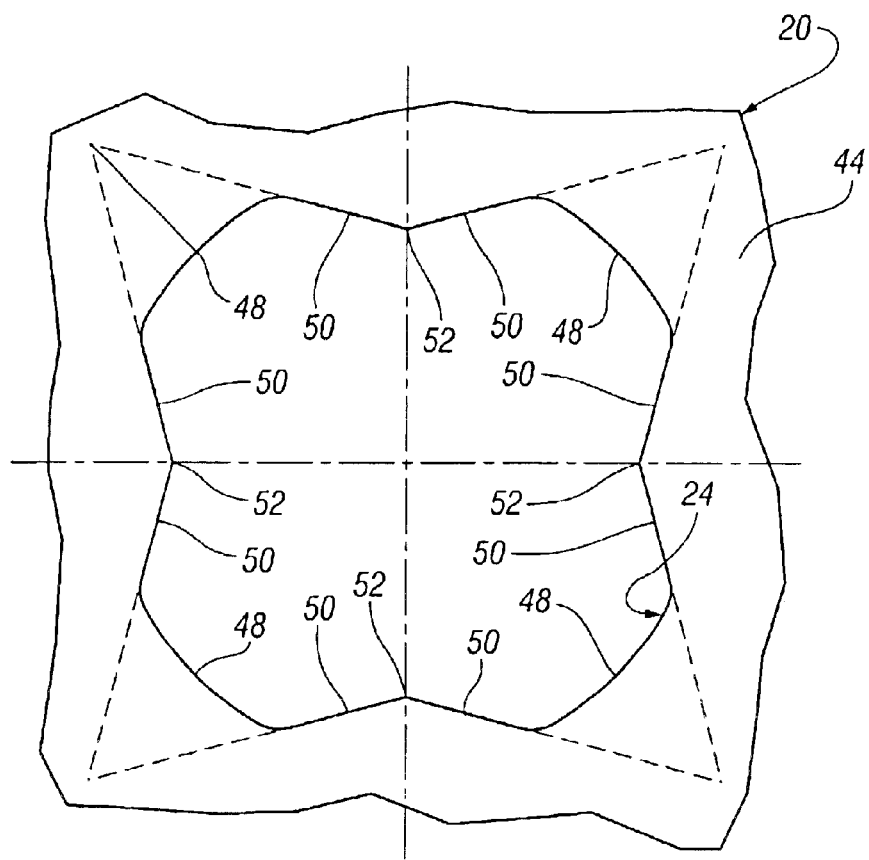
FIG. 6 is an axial end view of a guide opening in a receiving member according to the present invention.

Referring now to FIG. 6, the flange or receiving member 20 has opposite sides defining a mounting surface 44 and a fastening surface 46. A guiding and locking opening 24 extends between the surfaces 44, 46. The opening 24 resembles a truncated star in which truncated portions of the star form pockets 48. The pockets 48 have angled sides 50 and are joined by inward projections 52. The number of pockets 48 is equal to the number of apexes 42 on the locking portion 38 of the insertion member 22.

Figure 7:
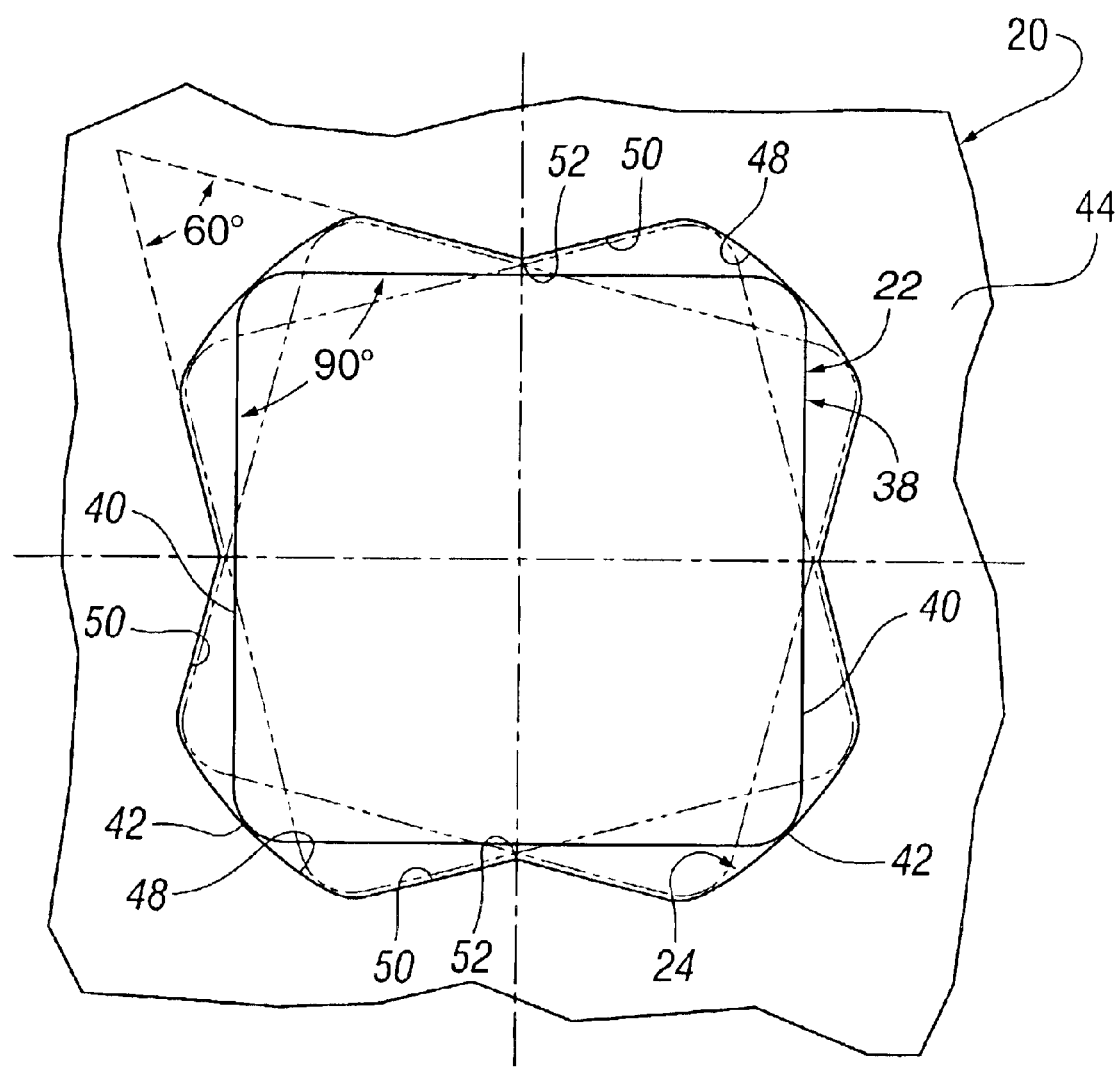
FIG. 7 is a view similar to FIG. 6 and showing the locking portion of the insertion member of FIG. 2 within the guide opening of FIG. 6.

FIG. 7 shows the locking portion 38 of the insertion member 22 within the opening 24 of the receiving member 20. The four apexes 42 of the locking portion 38 are positioned inside the pockets 48 of the opening 24. The sides 40 of the locking portion 38 lie adjacent the inward projections 52.

The tapered shape of the locking portion 38 provides an entry portion with smaller cross dimensions than the opening 24 to provide additional room for insertion. As the tapered locking portion 38 is further inserted the tapered sides of the locking portion 38 engage the sides 50 and inward projections 52 of the opening 24. This causes the insertion member 22 to center inside the opening 24.

Angular clearance between the sides 40 of the locking portion 38 and the sides 50 of the pockets 48 allows a misaligned insertion member 22 to be received by the opening 24. If the apexes 42 are completely misaligned with the pockets 48 of the opening 24, a slight rotation of the insertion member 22 will align the apexes 42 over the pockets 48.

The amount of angular clearance between the sides 40 of the locking portion 38 and the sides 50 of the pockets 48 determine how far the locking portion 38 is able to rotate inside the opening 24. The dashed lines of FIG. 7 show how far the locking portion 38 can be rotated in either direction before engaging the sides 50 of the pockets 48. The maximum amount of angular rotation of the locking portion 38 in the opening 24 is approximately equal to the difference between the angles of the sides 50 of the pockets 48 and the angles of the apexes 42 of the locking portion 38. In the present invention, the apexes 42 have a 90° angle and the sides 50 of the pockets 48 have a 60° angle. Therefore, the amount of rotation allowed is approximately 30°. The angle of rotation may be changed for other applications by changing the angle of the sides 50 or the apexes 42.

The connecting portion 34 of the insertion member 22 is inserted into the opening 24 of the receiving member 20. As the sides 40 of the locking portion 38 contact the sides 50 of pockets 48, the insertion member 22 centers inside the opening 24. Also, during insertion the apexes 42 of the locking portion 38 are received by the pockets 48 of the opening 24. After the connecting portion 34 extends beyond the fastening surface 46 of the receiving member 20, the abutment 36 of the insertion member 22 contacts the mounting surface 44 of the receiving member 18 to stop further insertion.

The nut or fastener 18 is threaded onto connecting portion 34 causing the insertion member 22 to rotate for a distance inside the opening 24 until the sides 40 of the locking portion 38 engage the sides 50 of the pockets 48. This contact creates a mechanical lock between the insertion member 22 and the receiving member 20, which cams the insertion member 22 to the center of the opening 24, and prevents further rotation of the insertion member 22. Thus, the fastener 18 can be rotated onto the insertion member 22 without the aid of a backup tool.

The foregoing description is directed, as an example, of joining a strut and a stabilizer link with a fastening assembly. However, it should be understood that various components of many other assemblies could be joined using a fastening assembly designed in accordance with the present invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An interlocking fastener assembly comprising:

a receiving member having opposite sides defining a mounting surface and a fastening surface, and a guiding and locking opening extending between the surfaces through the receiving member, the opening configured as a truncated star having multiple pockets with angled inner sides joined by inward projections between the pockets;

an insertion member having an abutment engaging the mounting surface of the receiving member, a connecting portion extending beyond the opening and a locking portion between the abutment and the connecting portion and disposed within the opening, the locking portion formed as a polygon having apexes received in the pockets and outer sides lying adjacent the inward projections and engagable with the inner sides of the pockets; and a fastener mountable on the connecting portion of the insertion member and engagable with the fastening surface of the receiving member for fixing the insertion member in the receiving member;

the insertion member being rotatable within the opening through a predetermined maximum angle prior to mounting of the fastener to assist entry of the insertion member into the receiving member, and the outer sides of the locking portion engaging inner sides of the pockets to lock the insertion member against further rotation during installation of the fastener without use of a backup tool.

2. An assembly as in claim 1 wherein the maximum angle of rotation of the locking portion in the opening is approximately equal to the difference between the angles of the sides of the pockets and the angles of the apexes of the locking portion.

3. An assembly as in claim 1 wherein the guide opening includes a pocket for each apex of the locking portion.

4. An assembly as in claim 3 wherein the locking portion is a square.

5. An assembly as in claim 1 wherein the connecting portion of the insertion member is threaded.

6. An assembly as in claim 5 wherein the fastener is a nut.

7. An assembly as in claim 1 including a ball end adjacent the abutment of the insertion member.

8. An assembly as in claim 7 including a stabilizer link having a socket pivotally attached to the ball end of the insertion member.

9. An assembly as in claim 1 wherein the locking portion is tapered inward toward the connecting portion of the insertion member to assist centering of the insertion member during assembly into the guide opening.

* * * * *